United States Patent [19]

Lippman et al.

[11] Patent Number: 4,872,941
[45] Date of Patent: Oct. 10, 1989

[54] AUTOMATIC WELDING APPARATUS FOR WELDING THERMOPLASTIC MATERIALS IN SHEET FORM

[76] Inventors: Glenn W. Lippman, 169 S. Buchanan Ave., Louisville, Colo. 80027-9505; Gerald Lippman, 3403 2nd St., Oceanside, N.Y. 11572

[21] Appl. No.: 118,601

[22] Filed: Nov. 9, 1987

[51] Int. Cl.[4] .............................................. B44C 7/00
[52] U.S. Cl. .................................. 156/497; 156/499; 156/555; 156/574
[58] Field of Search ............... 156/497, 499, 82, 544, 156/555, 574

[56] References Cited

U.S. PATENT DOCUMENTS

| | | | |
|---|---|---|---|
| 3,408,242 | 10/1968 | Rochla | 156/499 X |
| 4,146,419 | 3/1979 | Neidhart | 156/499 X |
| 4,440,588 | 4/1984 | Stevenson et al. | 156/497 X |
| 4,447,288 | 5/1984 | Seaman | 156/499 X |
| 4,504,352 | 3/1985 | Meyer | 156/499 |
| 4,533,423 | 8/1985 | Johnson et al. | 156/499 X |
| 4,743,332 | 5/1988 | Black | 156/499 X |
| 4,744,855 | 5/1988 | Ellenberger | 156/499 |
| 4,747,903 | 5/1988 | Miller | 156/499 X |

Primary Examiner—David Simmons
Attorney, Agent, or Firm—Brian D. Smith

[57] ABSTRACT

The present invention provides an automatic welding apparatus for welding a pair of horizontally overlapping thermoplastic materials in sheet form along the overlap thereof. The apparatus includes, in a preferred embodiment thereof, a chassis having a material guide including a pair of overlapping channels, vertically spaced from one another and said materials, to receive the overlapping portions of the materials and to maintain and to produce a separation between the materials. Located within the separation are an electrically heated prismatic member and a first and a second means to produce first and second streams of heated air to heat the materials to plasticity. A pair of pressure rollers acting against the materials and in a preferred embodiment a pair of guide rollers mounted on a guide plate attached to the aforementioned material guide are provided to urge the materials against one another so that they weld to one another.

The chassis has a set of wheels and an electrical motor to turn the wheels and the pressure rollers so that the apparatus of the present invention automatically welds the materials and advances along the overlap of the materials.

20 Claims, 7 Drawing Sheets

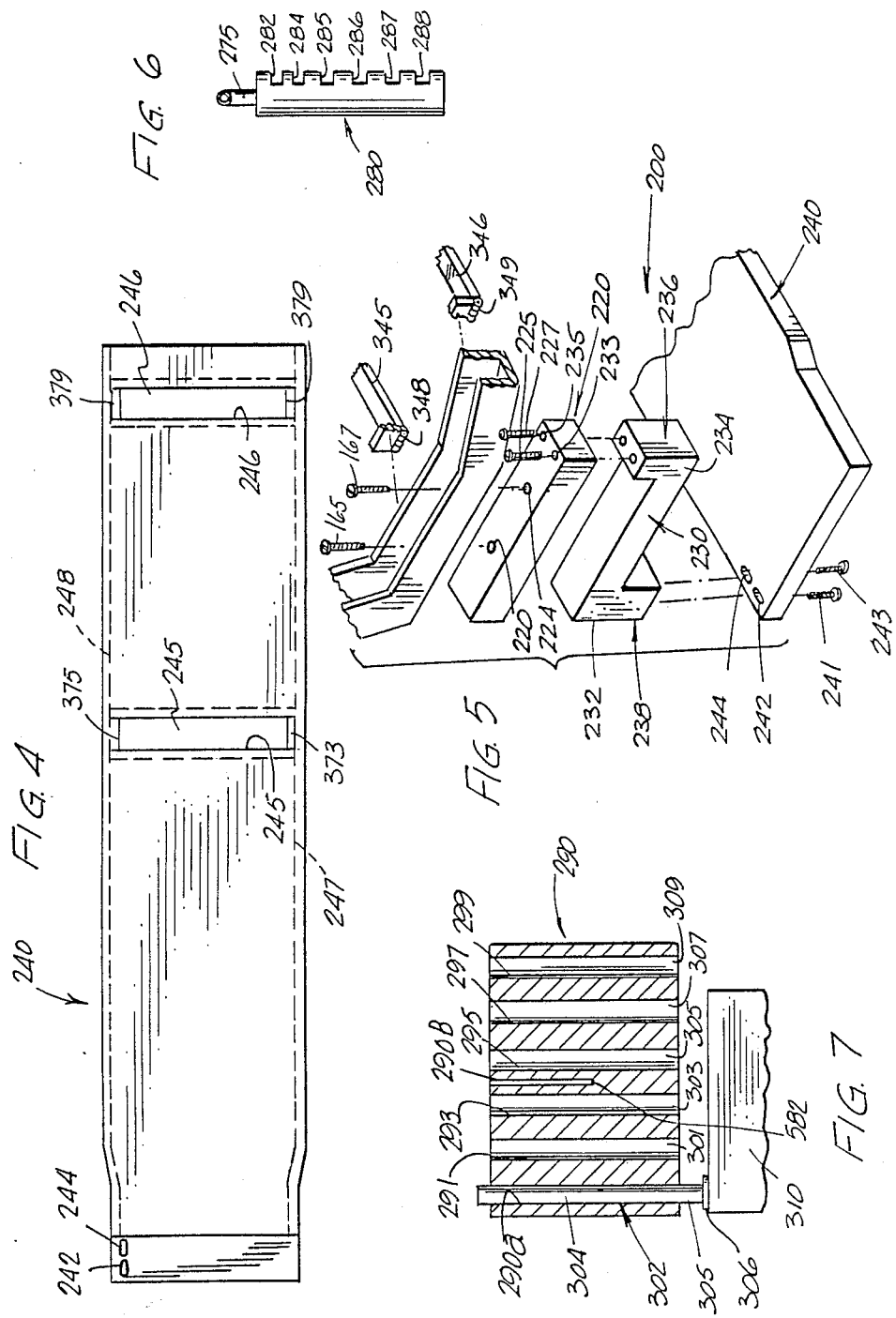

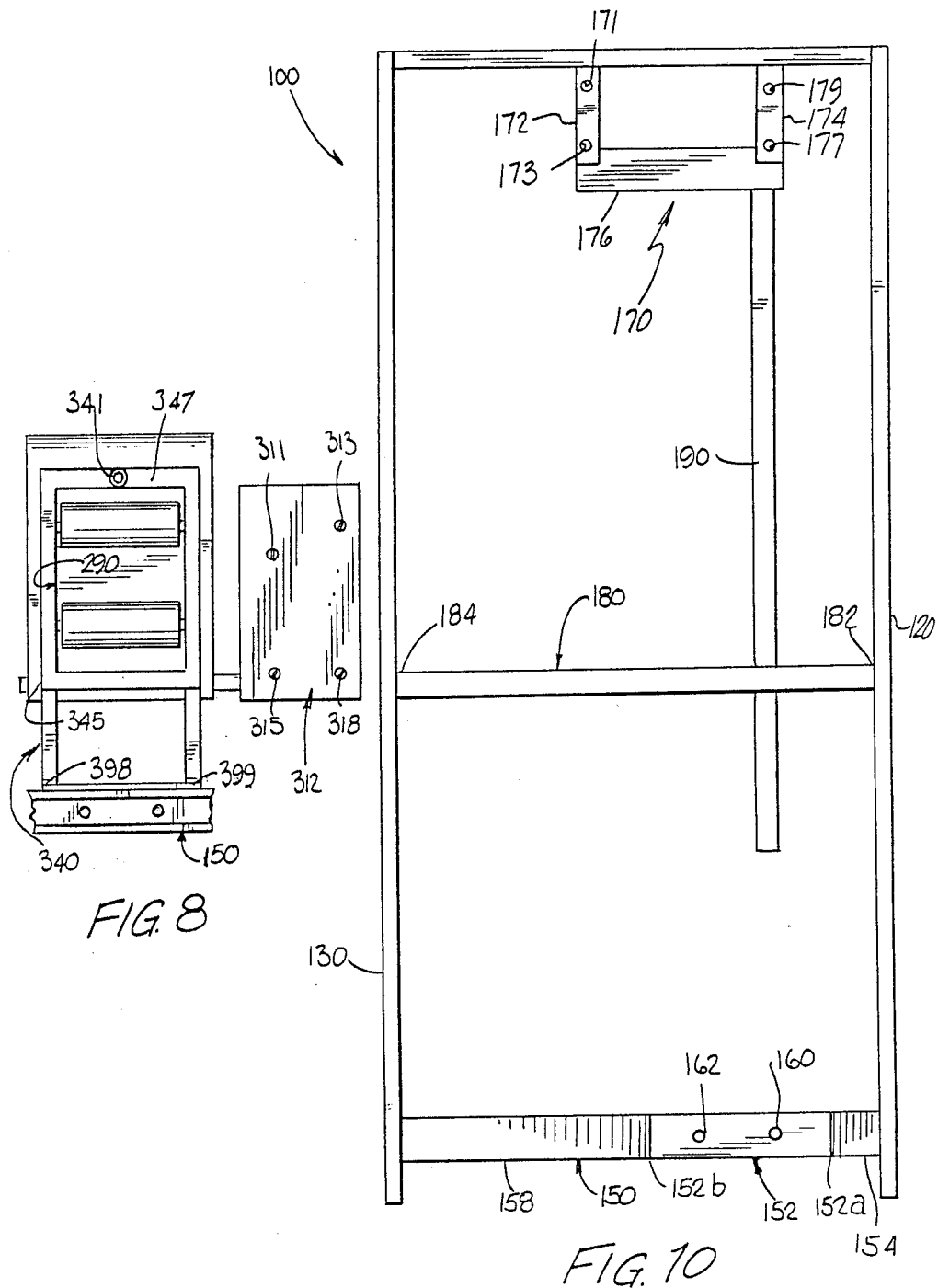

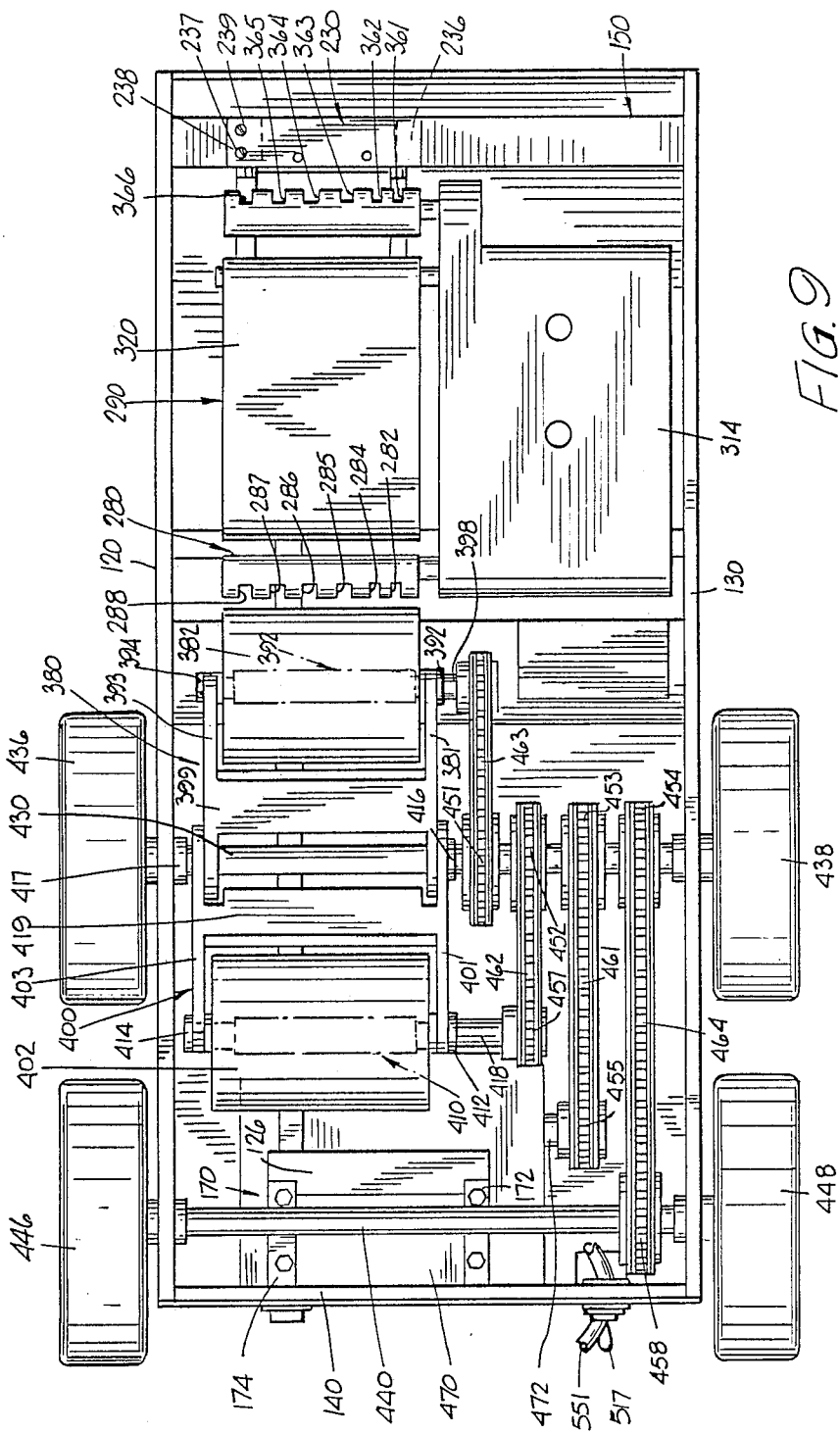

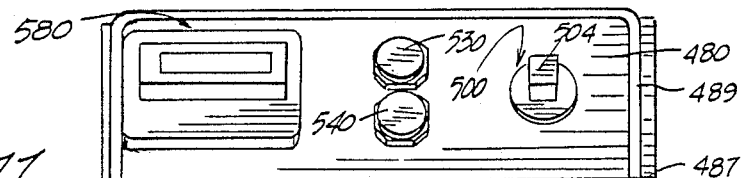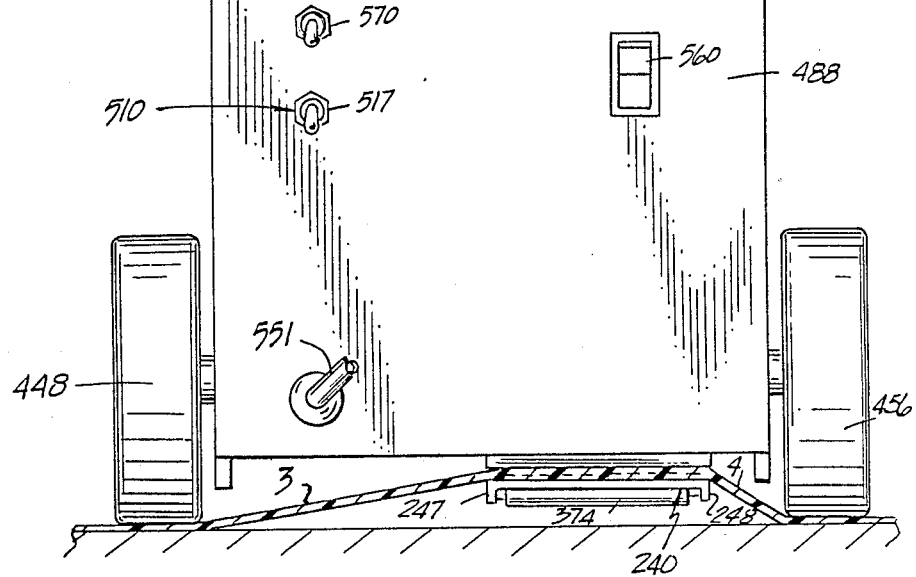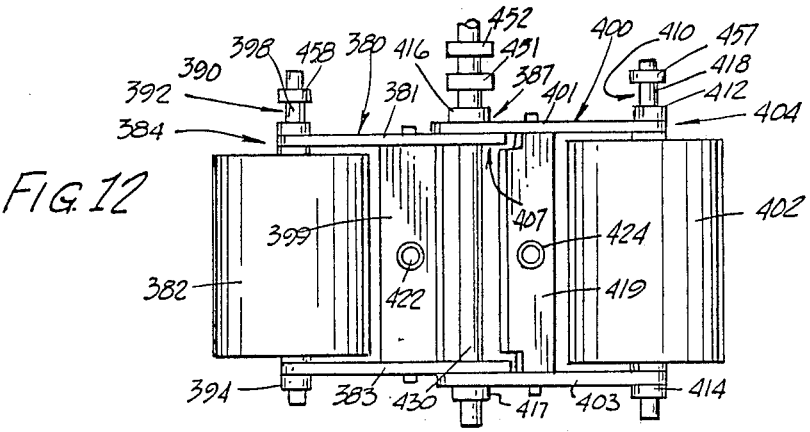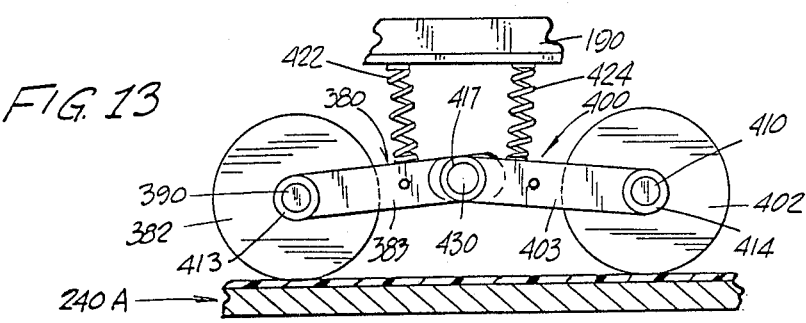

AUTOMATIC WELDING APPARATUS FOR WELDING THERMOPLASTIC MATERIALS IN SHEET FORM

FIELD OF THE INVENTION

This invention relates to a welding apparatus for welding thermoplastic materials in sheet form and more particularly to an automatic welding apparatus for welding a pair of horizontally overlapping thermoplastic materials in sheet form along the overlap of the sheets.

BACKGROUND OF THE INVENTION

Pliable sheets of thermoplastic materials are commonly used in many industrial and civil construction applications. For instance a single ply form is utilized as a roof membrane to prevent leakage of water through a roof. Additionally, such sheets of thermoplastic materials are also used as pond liners to contain hazardous wastes and to prevent such wastes from seeping into the ground. Typically, in such applications, large sheets of thermoplastic materials are placed on the roof or into a containment pond in an overlapping relationship and then welded to one another along the overlap. This is done manually with an artisan separating the sheets along the overlap, applying heat by a hot air heating element between the separation and then using a roller to press the sheets back into contact with one another to provide a weld. As can be appreciated, such manual welding techniques are very time consuming and therefore expensive. Moreover, the weld produced is not uniform and thus leakage sometimes occurs within the weld itself. The present invention therefore, seeks to automate this welding process to decrease the time involved in such construction as well as to insure that a uniform weld is produced at the overlap of the materials. Moreover, the welding can take place outdoors, over rough terrain, and therefore, it can be very difficult for an artisan, in the first instance, to produce a weld between materials.

SUMMARY OF INVENTION

The present invention provides an automatic welding apparatus for welding a pair of horizontally overlapping thermoplastic materials in sheet form. The apparatus includes a chassis of elongate configuration having a length and a width respectively forming a pair of sides, a front end and a rear end. The chassis is operable to be positioned, lengthwise over the overlap with the front and rear ends straddling the overlapping portions of the materials. Means connected to the front end of the chassis in an overlying relationship with respect to the overlapping portions are provided for maintaining a separation between the materials at the overlapping portions thereof. These means include a pair of horizontally overlapping channels, vertically spaced from one another and vertically spaced from the materials with each of the channels being sized and oriented to receive one of the overlapping portions of the materials. Means, located within the separation and connected to the chassis, are provided for heating the overlapping portions of the materials to plasticity. Means, connected to the chassis and situated between the rear end of the chassis and the plasticity heating means in an overlying relationship with respect to the materials, are provided for urging the materials together into their overlapping position and against one another. Means, connected to the chassis, are included for providing a rolling engagement between the chassis and the thermoplastic materials and for supporting the chassis and the separation maintaining means above the thermoplastic materials. As a result of the foregoing structure, as the chassis is propelled along the overlapping portions, the overlapping portions of the materials, heated to plasticity, weld to one another along the overlap within the urging means.

BRIEF DESCRIPTION OF THE DRAWINGS

While the specification concludes with claims particularly pointing out and distinctly claiming the subject matter which is regarded as the present invention, it is believed that the invention will be better understood from the following description taken in connection with the accompanying drawings in which:

FIG. 4 is a fragmentary, top plan view of a guide plate of the present invention.

FIG. 5 is an exploded, fragmentary front view of a guide means of the present invention.

FIG. 6 is a fragmentary, top plan view of a heating manifold of the present invention.

FIG. 7 is a fragmentary, top plan cross-sectional view of a prismatic heating member of the present invention.

FIG. 8 is a fragmentary, top plan view of a prismatic heating member of the present invention and a carriage of the present invention utilized to urge the sheet materials against the prismatic heating member and the guide plate of the present invention.

FIG. 9 is a bottom plan view of the welding apparatus of the present invention.

FIG. 10 is a bottom plan view of a chassis of the present invention.

FIG. 11 is a rear view of the welding apparatus of the present invention.

FIG. 12 is a fragmentary, top view of a pair of pressure rollers of the present invention.

FIG. 13 is a fragmentary, elevational view of an alternative embodiment of a guide plate of the present invention.

DETAILED DESCRIPTION OF THE PRESENT INVENTION

Figure 1:
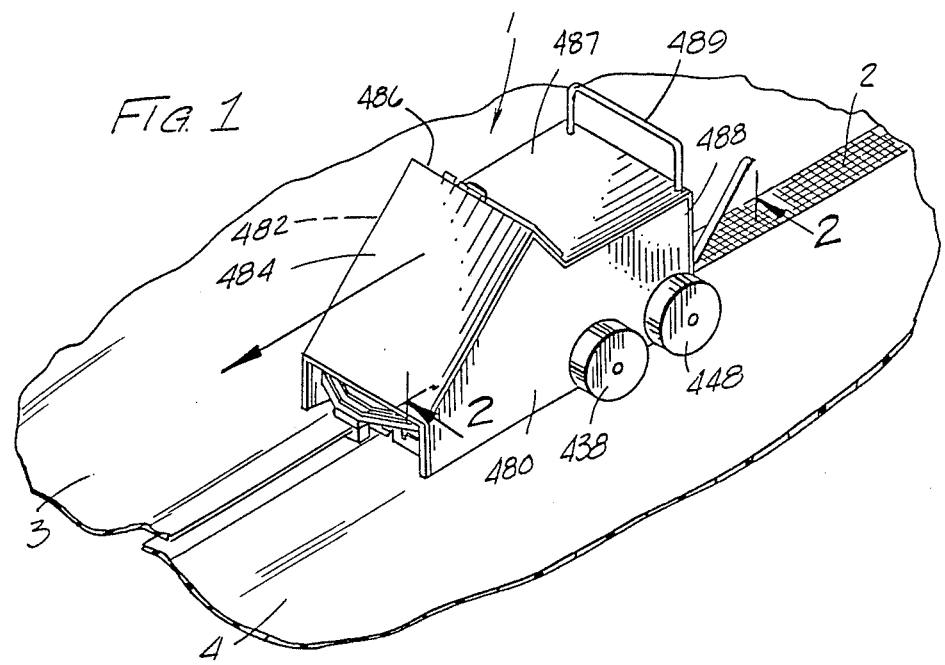
FIG. 1 is a perspective view of the welding apparatus of the present invention welding thermoplastic materials in sheet form.
Figure 3:
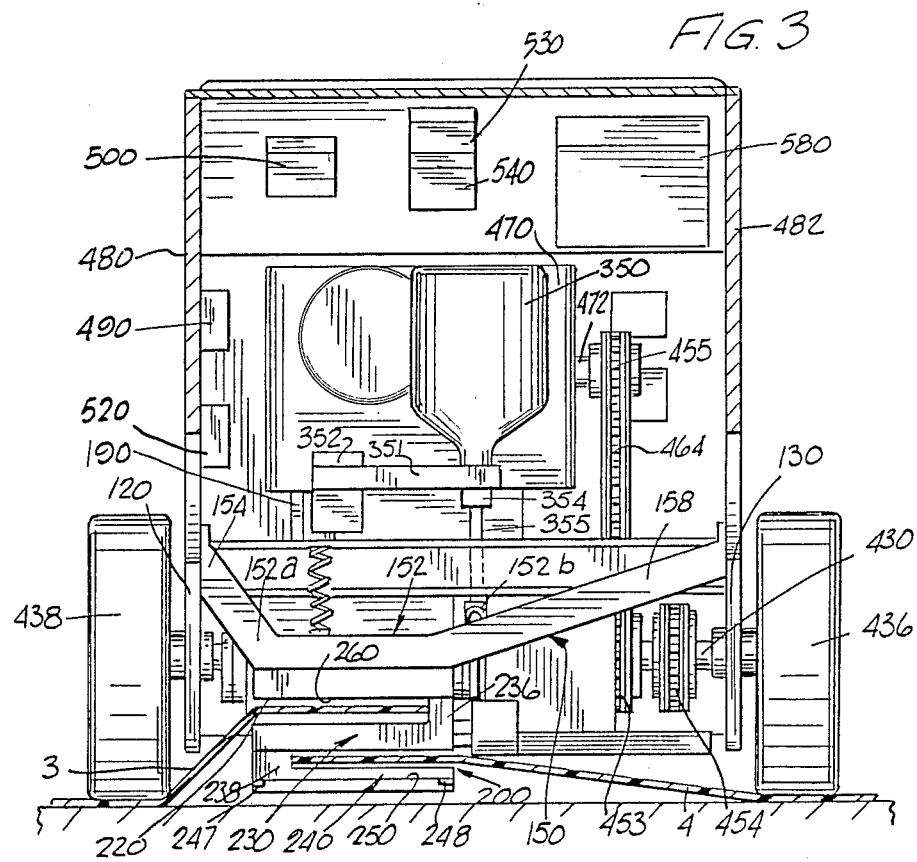
FIG. 3 is a front elevational view of the welding apparatus of FIG. 1 with the front cover plate removed.
Figure 2:
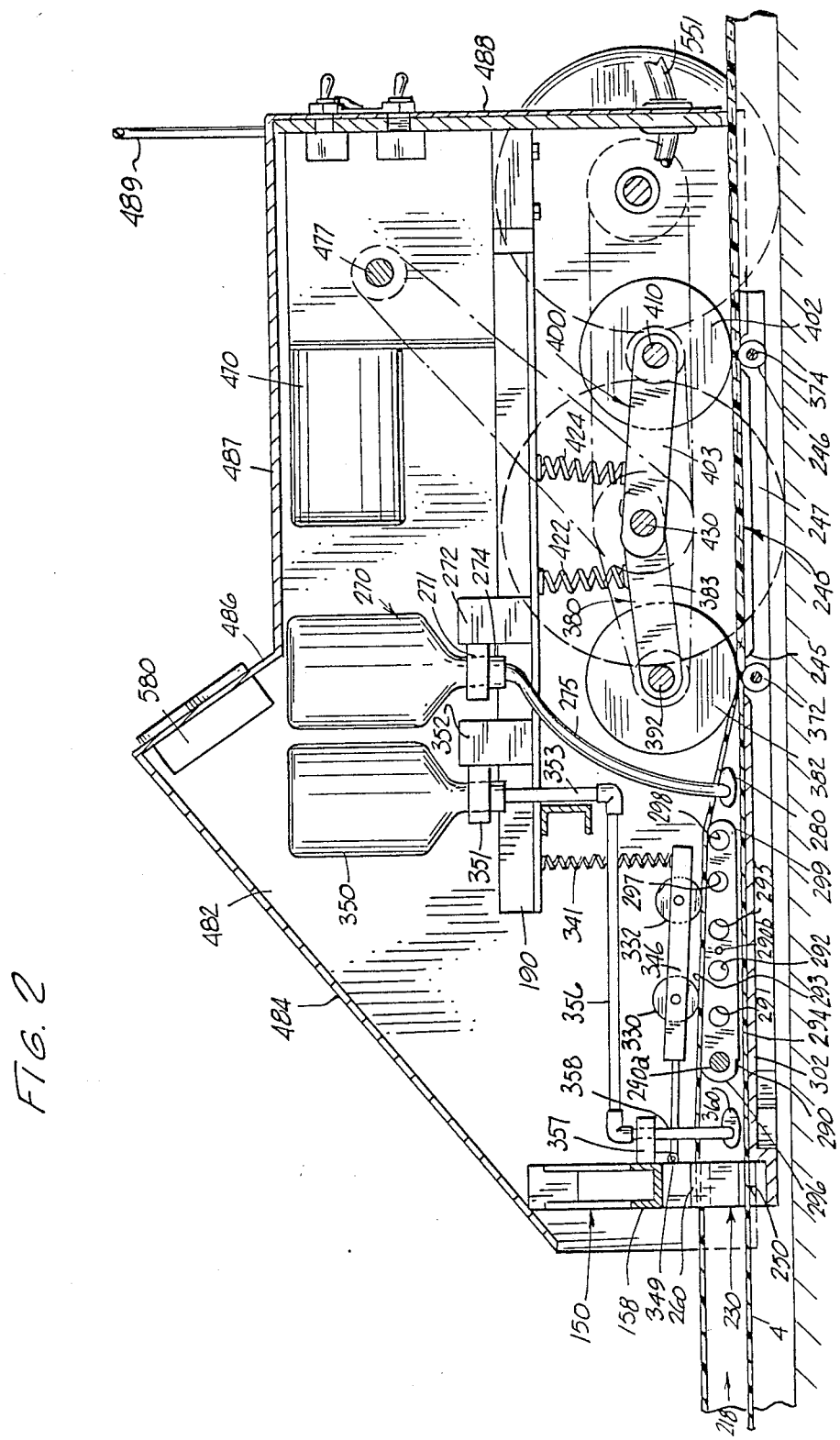
FIG. 2 is a cross-sectional view of the apparatus illustrated in FIG. 1 taken along line 2—2 of FIG. 1.
Figure 14:
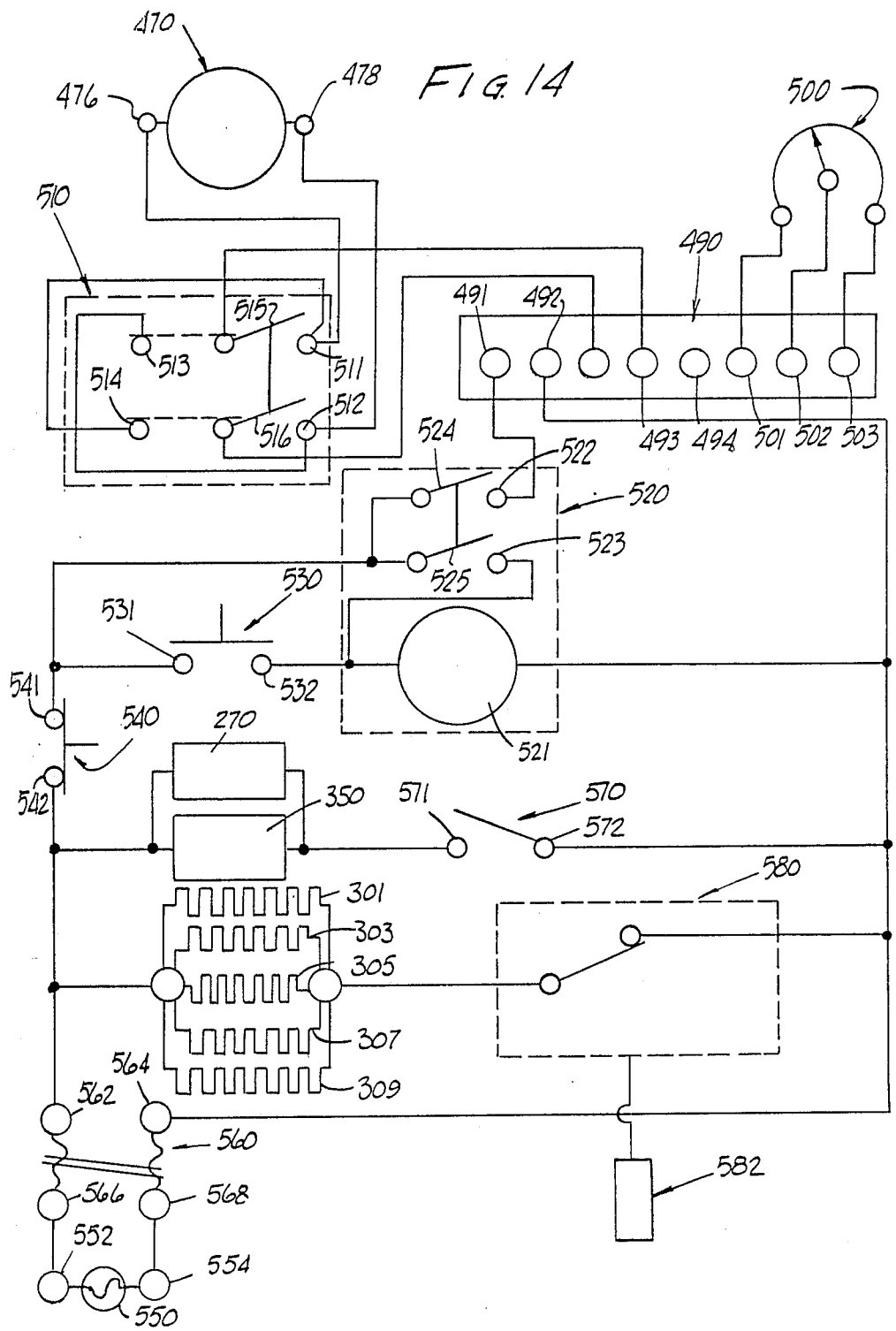
FIG. 14 is a schematic wiring diagram of the electrical components utilized in a preferred embodiment of the present invention.

With reference to FIG. 1, the automatic welding apparatus 1 of the present invention is illustrated in a preferred embodiment thereof as being positioned over thermoplastic sheets 3 and 4 which are placed in an overlapping relationship to one another at 5. Referring now to FIGS. 2 and 3, the overlapping portions of sheets 3 and 4 are threaded into channels 250 and 270 of a preferred material guide 200, the apparatus is turned on and the entire apparatus 1 travels along overlap 5 on preferred driven wheels 436, 438, 446 and 448 to produce weld 2 between sheets 3 and 4.

Referring now to FIGS. 2 and 4, after the sheets pass through channels 250 and 260 of material guide 200, a separation between the sheets is produced and maintained. Within this separation, means are provided to heat the sheets 3 and 4 to plasticity. These means can be a first hot air source 270 which supplies streams of heated air through a preferred first manifold 280, a preferred prismatic member 290 that contains preferred electrical heating elements 301, 303, 305, 307 and 309, and a preferred second hot air source 350 which supplies streams of heated air through a preferred second manifold 360. The heated portions of the sheets 3 and 4 which are supported by a preferred guide plate 240 (Illustrated in FIG. 4) above the sheets and within apparatus 1. These heated portions of the sheets 3 and 4 then pass into means for urging the sheets against one another which in the preferred illustrated embodiment are pressure rollers 382 and 402 which are respectively biased against the sheets 3 and 4 and the guide plate 15 by springs 422 and 424. This forces the overlapping sheets 3 and 4 back into contact with one another to produce the weld 2 along sheets 3 and 4 which exit the rear end of apparatus 1 as the apparatus 1 travels in a forward direction.

Having thus generally described the operation of the preferred embodiment of applicants invention a more detailed description thereof begins with that of the chassis 100 of a preferred embodiment of the applicants' invention. Referring now to FIG. 10, chassis 100 can include a pair of longitudinal members of elongate configuration 120 and 130 spaced apart from one another to form the sides of the chassis 100. Additionally a pair of transverse members of elongate configuration 140 and 150 can be provided spaced apart from one another. The transverse members 140 and 150 and the longitudinal members 120 and 130 are connected end to end to form a rectangular configuration. Transverse member 150 forms the front of the chassis and transverse member 140 forms the rear of the chassis.

Referring now to FIG. 3, transverse member 150 can be provided with a horizontal element 152 located below the longitudinal members 120 and 130, a left element 154 and a right element 158. Horizontal element 152, located below the longitudinal members 120 and 130, has a pair of opposed ends 152a and 152b. As illustrated, left element 154 connects end 152a of horizontal element 152 to longitudinal element 120 and right element 158 connects the other end 152b of horizontal element 152 to longitudinal member 130. Referring to FIGS. 5 and 10, bores 160 and 162 can be provided in horizontal element 152 to allow machine screws 165 and 167 to be positioned within and screwed into tapped bores 220 and 224 of a preferred attachment member 220 of a material preferred guide 200, which will be discussed in more detail hereinafter. Transverse member 140 is an elongate member with no angles along its length. As illustrated longitudinal members 120 and 130 can be fabricated from steel plate machined to bars approximately 6.35 mm. in thickness and 61 cm. long by 5.1 cm. wide; and transverse members Horizontal member 140 can be about 23 cm long. The angles and lengths of the included members of transverse member 150 are chosen with the diameter of wheels 436, 438, 446 and 448 such that guide plate 240 is preferably between about 1.27 cm. to about 5.08 cm above the sheets to be welded. The advantage of this is to permit material guide 200 to be as close to the materials 3 and 4 as possible to minimize the horizontal separation of the materials 3 and 4 along the overlap thereof when materials 3 and 4 pass within channels 250 and 260, when apparatus 1 is in use, but still allow welding on rough terrain.

Chassis 100 can also include a motor mount 170 for attaching an electrical motor 470 to the chassis 100. This motor mount includes a pair of spaced apart first and second lengthwise elements 172 and 174 located between longitudinal members 120 and 130 and parallel thereto. Each of the lengthwise elements 172 and 174 are connected at one end to transverse member 140. Also included is a cross element 176 connected to the other ends of lengthwise elements 172 and 174 to form a rectangular configuration with transverse member 140. Mounting holes 171, 173, 177 and 179 are provided to attach the motor 270 to the chassis 100 by means of nuts and bolts in a manner well known in the art. The chassis can also include a cross member 180 located between the motor mounts 170 and transverse member 150. Cross member 180 has a pair of opposed ends 182 and 184. Cross member 180 is connected at ends 182 and 184 at right angles to longitudinal members 120 and 130. Cross member 180 is located between pressure rollers 380 and 400 and transverse member 150. Lastly a central lengthwise member 190, can be provided and located between the longitudinal members 120 and 130 and parallel thereto. Central lengthwise member 190 is cantilevered from the motor mounts at cross element 176. Central lengthwise member 190 is sized to extend from the motor mounts and over cross member 180.

Although chassis 100 is described as being fabricated from various steel stock pieces, welded together, is understood that other rigid materials such as plastics, wood and the like could be utilized to form any one or all of the members or elements forming the chassis 100.

Turning now to a detailed description of the material guide 200 of the illustrated, preferred embodiment, with reference to FIGS. 3 and 5, material guide 200 can comprise the illustrated grating to provide a means for maintaining a separation of the thermoplastic materials in sheet form 3 and 4 at the overlap 5. It can include attachment member 220 of elongate configuration, connected, to the front end of the chassis 100 formed by transverse member 150, parallel thereto and located on the underside of the chassis 100 in a horizontal orientation. It can be attached to the front end of chassis 100 (transverse member 150) by tapped bores 222 and 224 and by the aforementioned machine screws 165 and 167. A separation member 230 can be provided having a pair of ends 232 and 234. Separation member 230 is also of elongate configuration and is located between attachment member 220 and guide plate 240. Separation member 230 is oriented parallel to attachment member 220. Ends 232 and 234 comprise a pair of first and second spacer elements 236 and 238. Each of the spacer elements 236 and 238 has a height at least equal to the thickness of the sheet materials and a length less than that of the separation member 230. The spacer elements 236 and 238 are oriented in opposite vertical directions. The first spacer element 236 connects separation member 230 to attachment member 220 by way of tapped bores 233 and 235 and machine screws 225 and 227 which pass through bores 226 and 228 of attachment member 220. With reference to also to FIG. 9, the second spacer element 238 connects the other of the ends of the separation member 230 to guide plate 240 by means of machine screws 241 and 243 which pass through bores 242 and 244 of guide plate 240 and are threaded into threaded bores 237 and 239 of separation member 230. Thus, channel 250 of such separation means as described above is formed by the inner periphery of guide plate 240, second spacer element 238 and separation member 230 and channel 260 of such separation means is formed by the inner periphery of attachment member 220, first spacer element 236 and separation member 230. The channels 250 and 260 horizontally overlap one another at least to the extent the pair of thermoplastic materials 3 and 4 overlap one another. The depths of the channels so formed are directed towards one another and the channels are vertically spaced from one another and materials 3 and 4. Thus, channels 250 and 260 are sized and oriented to receive the overlapping portions of materials 3 and 4. As a result when portions of sheets 3 and 4 are threaded into channels 250 and 260 a separation is produced and maintained at the overlap by virtue of the separation member 230.

Thus, once the overlapping portions of sheets 3 and 4 are threaded into channels 250 and 260, the separation produced thereby is automatically maintained. Although not illustrated, as would be well known in the art, material guide 200 could be fabricated from a sold stock of machined material with the channels 250 and 260 machined into such solid stock. Alternatively, the members and elements of the guide 200 could be connected to one another by welding. In this regard channels 250 and 260 are each about 5.08 cm. long by about 0.635 cm. wide in the illustrated preferred embodiment. The vertical spacing between the channels is approximately 1.0 cm. It is understood that the foregoing dimensions were chosen for the welding of a wide range in sheet thickness and that modifications could be made in such dimensions of the channels without departing from the spirit and scope of the disclosed invention.

Referring now to FIGS. 2, 6 and 7, means illustrated therein are provided for in the illustrated preferred embodiment for heating sheets 3 and 4 to plasticity. In the illustrated, preferred embodiment, a first set of streams of heated air are provided by first hot air source 270 and first manifold 280. Hot air source 270 in the illustrated preferred embodiment is a first electrically powered heat gun that is modified by removal of the handle and trigger switch. In the illustrated preferred embodiment the heat guns utilized for hot air sources 270 and 350 (which will be discussed in detail hereinafter,) are well known in the art and can be replaced by any similar hot air sources. In the preferred embodiment, the hot air source 270 can preferably be, at minimum, a heat source that is equivalent to a 3600 watt heat gun and hot air source 350 can preferably be, at minimum, a heat source that is equivalent to, at minimum, a 1300 watt heat gun. It is understood that the aforementioned heat outputs of the heat guns are preferred and could be changed without departing from the scope of the invention. Referring to FIG. 6, first manifold 280 can be a stainless steel tube which is formed to an oval shape. Manifold 280 is sealed at one end and open at the other end. A pipe 275, that can also be formed from stainless steel, is connected to the nozzle 274 of heat source 270 and the open end of first manifold 280 for conducting the heated air thereto. First manifold 280 is oriented transversely transversely with respect to chassis 100 with the minor axis of the formed oval being adjacent to a prismatic member 290 which will be discussed in more detail hereinafter. A plurality of vertical slots, 282, 284, 285, 286, 287 and 288 can be provided to form a first set of streams of heated air that are directed rearwardly and against the sheets 3 and 4. The slots 282, 284, 285, 287 and 288 are vertically oriented and situated on the minor axis of the formed oval facing away from prismatic member 290.

The heating means of the present invention can also include a second type of heating source that in the illustrated, preferred embodiment can include a prismatic member 290. Referring now to FIGS. 2 and 7 prismatic member 290, has a uniform cross-section that includes a curved top surface 292, a straight bottom surface 294 spaced from the top surface 292, an arcuate front surface 296 and a straight, vertical rear surface 298. Prismatic member 290 is oriented so that the front surface 296 faces the front end of the chassis 100, rear surface 298 faces the rear end of the chassis 100, top surface 292 thus faces material 3 and bottom surface 294 faces material 4. The bottom surface 294 is spaced from top surface 292 or vice versa a maximum distance that is greater than that of the separation maintained by the separation maintaining means to help insure that the materials 3 and 4 remain in contact with the top and bottom surfaces 292 and 294. The preferred curved top surface 292 function to smoothly further separate the materials 3 and 4 to prevent the tearing thereof when materials 3 and 4 are heated. It is understood that prismatic member 290 could have other shapes and still be within the scope of applicants' invention. However, if for instance, prismatic member 290 had a rectangular cross-section in such possible embodiment, the sharp edges produced thereby could possibly tear materials 3 and 4 when heated.

Prismatic member 290 is provided with bores 291, 293, 295, 297 and 299 which extend transversely through prismatic member 290 between the front and rear surfaces 296 and 298 thereof. The bores 291, 293, 295, 297 and 299 contain cartridge-type electrical heating elements 301, 303, 305, 307 and 309. These cartridges, when connected to an electrical power source, heat prismatic member 290 which in turn heats sheets 3 and 4.

Prismatic member 290 can be conventionally machined from brass or stainless steel stock and covered with a fiberglass sleeve 320 impregnated with Teflon to insure that sheets 3 and 4 do not stick thereto. The electrical heating element cartridges utilized in the illustrated preferred embodiment are preferably 110 volt, 300 watt or alternatively 120 volt, 250 watt cartridges well known in the art. Such heater cartridges, which can be purchased by a variety of suppliers, can have external dimensions of about 7.62 cm in length and about 1.27 cm in diameter. Although 5 cartridges were utilized in the illustrated, preferred embodiment, more or less cartridges could be utilized depending upon such factors as wattage, size etc. In any event, with the cartridges utilized herein prismatic member 290 is capable of a temperature of about 649 degrees centigrade.

With reference to FIG. 2, in order to insure that sheets 3 and 4 remain in contact with heating member 290, prismatic member 290 is preferably, pivotably connected to a chassis 100 by pivot shaft 302 which at one end 304 is fixedly connected within bore 290a to fixedly connect pivot shaft 302 to front surface 296 and pivotably connected at end 305 to insulating block (which can be fabricated from wood) 310 by bearing 306. The insulating block 310 is in turn connected to longitudinal member 130 by wood screws. Insulating block 310 is covered, top and bottom by plates 312 and 314 which are attached to block 310 by wood screws such as illustrated 311, 313, 315 and 317 in FIG. 8 for top plate 312 in a manner well known in the art. Thus, prismatic member 290 is pivotably connected to a side of chassis 100 formed by longitudinal member 130. The pivotable attachment of prismatic member 290 functions with contact rollers 330 and 332 which bear against thermoplastic material 3 to insure sheet 3 is in contact with prismatic member 290. In addition, the action of contact rollers 330 and 332 also cause prismatic member 290 to rotate by its pivot shaft 302 against sheet 4 and guide plate 240. As can be appreciated, the purpose of this is to insure that at least a portion of both sheets 3 and 4 remain in contact with prismatic member 290 to insure the heating of sheets 3 and 4.

Referring now to FIG. 8, contact rollers 330 and 332 are pivotably mounted within a frame 340 located adjacent to top surface 292. Frame 340 includes arm elements 345 and 346 of elongate configuration spaced apart from one another and parallel thereto and transverse connecting element 347 also of elongate configuration. Transverse connecting element 348 is connected to the arm elements 345 and 346 over prismatic member 290. Arm elements 345 and 346 are pivotably connected to the chassis by hinges 348 and 349. Rollers 330 and 332 are pivotably connected to the arm elements 345 and 346 between connecting element 347 and transverse element 150 that forms the front end of the chassis 100. As can best be seen in FIG. 2 a spring 341 is provided. Spring 341 bears against central lengthwise member 190 and transverse connecting element 348 to bias the contact rollers 330 and 332 against sheets 3 and 4 and prismatic member 290. In the illustrated preferred embodiment contact rollers were about 7.6 cm. long by about 2.5 cm. in diameter and were fabricated from machined cold rolled steel bar stock.

It is understood that the frame 340 and the pivotable connection of prismatic member 290 could be deleted from a possible embodiment of the present invention. As could be appreciated, the disadvantage of such a deletion in a possible embodiment would be that the materials, such as 3 and 4, not being forced into contact with prismatic member 290, could on occasion not be sufficiently heated to properly weld. As a result, defects in the weld between materials 3 and 4 could occur.

A second set of streams of heated air can be provided by second hot air source 350 and second manifold 360. Second hot air source 350, except for the wattage requirements discussed above, can be identical to first hot air source 270 and second manifold 360 can be identical to first manifold 280. The second manifold 360 and the associated slots thereof (361, 362, 363, 364, 365 and 366) can be identical to the first manifold 280 and the slots thereof. The slots of first manifold 280 face away from prismatic member 290 and hence are oriented towards the rear end of the chassis 100. The slots of the second manifold 360 also face away from prismatic member 290 and are hence oriented towards the front end of chassis 100. The mounting of hot air sources 270 and 350 can be identical. As can best be seen in FIG. 3, second hot air source 350 can be connected to central lengthwise member 190 by means of a strap 351 connected to an insulating block 352, which is in turn connected to central lengthwise member 190. First hot air source 270 is likewise connected to central lengthwise member 190 by means of a strap 271 and insulating block 272. Heated air from nozzle 354 of second hot air source 350 can be conducted to second manifold 360 by tubes 355, 356 and 358 which can be fabricated from brass or stainless steel. Tube 358 passes through insulating block 357 which is in turn attached to element 158 of transverse member 150. The two heat guns serving as hot air sources 270 and 350 are electrically connected in parallel and as will be described in detail hereinafter, connected to an electrical power source. The purpose of the second set of streams of heated air is to remove all dust and moisture from the sheets to be welded such as 3 and 4.

For very thin materials 3 and 4, prismatic member 290 can be turned off, by means that will be described in detail hereinafter, and materials 3 and 4 are thus, heated to plasticity by only the first hot air source 270. Hence, it can be said that at least for very thin materials, the use of prismatic member 290 is an optional element of a possible embodiment of the subject invention. Moreover, the second heated air source 350 and manifold 360 can be deleted from a possible embodiment of the present invention. However, it has been found that the deletion of such second set of streams of heated air from second manifold 360 decreases the speed of the welding operation of the apparatus 1 of the present invention in certain applications where moisture is present on the materials 3 and 4.

Referring now to FIGS. 2 and 4, guide plate 240 is located underneath the chassis in a parallel planar orientation with respect to the sides of the chassis. The guide plate 240 forms part of the means of applicants' invention to urge materials 3 and 4 against one another after the materials are heated to plasticity to produce a weld between materials. Guide plate 240 also serves to guide the overlapping sheet materials through the means heretofore mentioned to heat the sheets 3 and 4 to plasticity. More importantly, guide plate 240 serves as welding table that separates the sheets from obstacles in the terrain. Thus, guide plate 240 serves to provide the welding apparatus 1 with an all-terrain capability. As illustrated, guide plate 240 is of rectangular planar, elongate configuration and should have a length that extends from material guide 200 to at least the pressure rollers 382 and 402. As can best be seen in FIG. 4, guide plate 240 is preferably provided with a pair of bores 242 and 244 to receive machine screws 241 and 243 to thread into threaded bores 237 and 239 of separation member 230 to attach guide plate 240 to material guide 200. Guide plate 240 is also preferably provided with slots 245 and 246 transversely extending across guide plate 240 and spaced between the ends thereof so as to directly underlie pressure rollers 382 and 402. Referring to FIG. 2 guide rollers 372 and 374 are pivotably connected to the underside of guide plate 240, as will be discussed hereinafter. Guide rollers 372 and 374 are sized so that a portion thereof is operable to contact the pressure rollers 382 and 402 through the slots 245 and 246. Thus, guide rollers 372 and 374 cooperate with pressure rollers 382 and 402 to thus serve as a bonding nip for the overlapping portions of materials 3 and 4 by bearing against the overlapping portions of the materials and pressure rollers 382 and 402. As can best be seen in FIGS. 2 and 3, the underside of guide plate 240 is preferably provided with a pair of spaced stiffeners 247 and 248 connected thereto. As illustrated, the stiffeners 247 and 248 are of elongate configuration. They are spaced apart from one another and extend lengthwise, along the underside of guide plate 240, on either side of the slots 245 and 246. Stiffeners 247 and 248 besides being structural members of the guide plate 240 to insure the rigidity thereof also carry bearings 373 and 375 and 377 and 379 respectively mounted on either side of guide rollers 372 and 374. These aforementioned bearings provide a pivotable attachment of rollers 372 and 374. As illustrated in FIG. 13 slots 245 and 246 together with rollers 372 and 374 can be deleted such that the pressure rollers 380 and 400 directly bear on sheets 3 and 4 and alternative guide plate design 240A. This is not preferred in that the friction between the sheets 3 and 4 and the guide plate 240A tend to produce a shearing stress in the sheet material that decreases the integrity of the weld. Moreover, stiffeners 247 and 248 can be deleted from a possible embodiment of the present invention. However, guide plate 240, depending on the thickness thereof, could in such embodiment possibly bend upon pressure of the pressure rollers 382 and 402.

Guide plate 240 of the preferred embodiment can have dimensions of about 49.5 cm. by about 12.7 cm. As illustrated, the 12.7 cm width can taper to about 10.8 cm. Plate 240 can be formed from steel plate. The guide rollers can each be about 7.62 cm. in length and about 2.54 cm. in diameter. against the overlapping portions of the materials and pressure rollers 382 and 402. As can best be seen in FIGS. 2 and 3, the underside of guide plate 240 is preferably provided with a pair of spaced stiffeners 247 and 248 connected thereto. As illustrated, the stiffeners 247 and 248 are of elongate configuration. They are spaced apart from one another and extend lengthwise, along the underside of guide plate 240, on either side of the slots 245 and 246. Stiffeners 247 and 248 besides being structural members of the guide plate 240 to insure the rigidity thereof also carry bearings 373 and 375 and 377 and 379 respectively mounted on either side of guide rollers 372 and 374. These aforementioned bearings provide a pivotable attachment of rollers 372 and 374. As illustrated in FIG. 13 slots 245 and 246 together with rollers 372 and 374 can be deleted such that the pressure rollers 380 and 400 directly bear on sheets 3 and 4 and alternative guide plate design 240A. This is not preferred in that the friction between the sheets 3 and 4 and the guide plate 240A tend to produce a shearing stress in the sheet material that decreases the integrity of the weld. Moreover, stiffeners 247 and 248 can be deleted from a possible embodiment of the present invention. However, guide plate 240, depending on the thickness thereof, could in such embodiment possibly bend upon pressure of the pressure rollers 382 and 402.

Guide plate 240 of the preferred embodiment can have dimensions of about 49.5 cm. by about 12.7 cm. It was formed from 49.5 cm. in length, 0.6 cm. in depth and about 0.7 cm. in thickness. The guide rollers are about 7.62 cm. in length and about 2.54 cm. in diameter.

Turning now to FIGS. 2, 9 and 12, the aforementioned preferred urging means can be seen to include pressure rollers 382 and 402. The outer periphery of pressure rollers 382 and 402 are preferably covered with rubber to prevent the heated sheets 3 and 4 from sticking to rollers 382 and 402 and further are about 8.9 cm in diameter and about 7.6 cm. in thickness. Rollers 382 and 402 are pivotably mounted within first and second pivoting forks 380 and 400 respectively. First pivoting fork 380 has a first pair of legs 381 and 383 located on either side of pressure roller 382. It additionally includes a first axle 390 pivotably connected through one end 384 of fork 380 by means of holes through fork 380 and bearings 392 and 394 that are concentrically located relative thereto in a manner well known in the art. Pressure roller 382 is fixedly connected to first axle 390. Second pivoting fork 400 has a second pair of legs 401 and 403 each of which is located on a side of pressure roller 402 and one the outside of legs 381 and 383. Second pivoting fork 400 has a second axle 410 pivotably connected to one end 404 of fork 400 by means of holes through fork 400 and bearings 412 and 414 that are concentrically located relative to the holes in a manner well known in the art. Pressure roller 402 is connected to second axle 410. As illustrated a third axle 430 (Which will be discussed in more detail hereinafter) is pivotably connected through the other ends 387 and 407 of forks 380 and 400, through holes in forks 300 and 400 and coincidentally located bearings attached thereto, 416 and 417. Thus, the forks 380 and 400 are free to pivot about the axle 430. As illustrated, second axle 410 has a second extending portion 418 and first axle 390 has a first extending portion 398 both of which extend past forks 380 and 400. Second extending portion 418 is longer than first extending portion 398, and hence extends past first extending portion 398. The purpose of this is to permit toothed sprockets 456 an 457 to be driven by roller bearing chains to drive pressure rollers 382 and 402. Pivoting forks 380 and 400 are also provided with first and second bearing members 399 and 419 connected, between the other ends 384 and 387 and the outer circumferences of pressure rollers 382 and 402 of respective forks 380 and 400, to the respective legs 381 and 383; and 401 and 403 thereof. Springs 422 and 424 bear against members 399 and 419 and against the central lengthwise member 190 to bias pressure rollers 382 and 402 against guide plate 240 and in the preferred embodiment guide rollers 372 and 374 thereof.

As can best be seen in FIG. 9 the chassis 100 of the preferred embodiment can be provided with a third and forth axle 430 and 440. Third and forth axle 430 and 440 are pivotably connected through longitudinal members 120 and 130 through holes 127 and 188 and 137 and 138 and coincidentally located and attached bearings 432 and 434; and 442 and 444. As stated previously, third axle 430 also extends through forks 380 and 400. As illustrated, the axles 430 and 440 are longer than the transverse extent of chassis 100. Wheels 436 and 438 are connected to third axle 430 and wheels 446 and 448 are connected to forth axle 440. The wheels provide a rolling contact between the chassis 100 and materials 3 and 4 and also support the chassis 100 above materials. Power is transmitted from the electric motor 470 to the wheels 436 and 438; and 446 and 448, as well as the pressure rollers 382 and 402 by the preferred means of a set of first, second, third, forth, fifth, sixth, seventh and eighth toothed sprockets 451, 452, 453, 454, 455, 456, 457, and 458. It should be pointed out here that sprocket 458 maybe disconnected to allow for wheels 446 and 448 to free-wheel. First, second, third and forth toothed sprockets 451, 452, 453 and 454 comprise a set of such sprockets and are spaced from one another and fixedly connected to third axle 430 between second fork 400 and the longitudinal member 130. Fifth toothed sprocket 455 is mounted on the end of the drive shaft 472 of the motor 470 and opposite to third toothed sprocket 453 to thus drive third axle 430. Also now referring to FIG. 12, seventh toothed sprocket 457 is connected to second extending portion 418 of second axle 410 and opposite to the second toothed sprocket 452 and sixth toothed sprocket 456 is connected to first extending portion 390 of first axle 390 opposite to first toothed sprocket 451. Eighth toothed sprocket 458 is connected to forth axle 440 opposite to forth toothed sprocket 454.

A first roller bearing chain 461, engaged on third toothed sprocket 453 and fifth toothed sprocket 455, transmits the power of the motor 470 to third axle 430. A second roller bearing chain 462 engaged on seventh toothed sprocket 457 and second toothed sprocket 452 transmits the power of second axle 410 to second pressure roller 402. A third roller bearing chain 463 engaged on first toothed sprocket 451 and sixth toothed sprocket 456 drives first pressure roller 382. Lastly a forth roller bearing chain 464 engaged on forth toothed sprocket 454 and eighth toothed sprocket 458 drives the rear wheels 446 and 448.

The apparatus 1 of the preferred embodiment of the present invention is preferably designed to travel in a forward direction at a varying rate of up to 20 feet per minute on wheels 436, 438, 446 and 448 of about 15.2 cm. in diameter for smooth terrain or alternately about 25.4 cm. in diameter for rough terrain. As can be appreciated, the tangential speed of pressure rollers 380 and 400 should be equal to the tangential speed of the wheels 436, 438, 446 and 448 to prevent bunching of sheets 3 and 4 and consequent loss of integrity of weld 5. Moreover, as would be known well to those skilled in the art, the sprocket size or more generally the gearing chosen is selected to reduce the speed of the motor and result in a traveling speed of the welding apparatus 1 of about 20 feet per minute.

In order to achieve the performance mentioned above the electric motor 470 having a drive shaft 472 can be a reversible direct current electric motor that in the illustrated preferred embodiment (FIGS. 2, 3 and 9) has a maximum output of about ⅛ horse power and was obtained from Bodine of Chicago, Ill. It is understood that the aforementioned transmission means and motor 470 could be deleted in a possible embodiment of the present invention. In such case the apparatus would be propelled by hand. In fact, the present invention contemplates a propelling means that is accomplished by simply pushing the apparatus 1 in a forward direction. However, the disadvantage of such embodiment would be that for certain material thicknesses, the materials, weakened by heating, could tear during the welding operation.

With reference to FIG. 1, 2 and 11 a preferred body is mounted on the chassis 100 which consists of side panels 480 and 482, a front panel 484 an instrument panel 486, a deck panel 487 and a back panel 488. A handle 489 to direct the apparatus 1 is provided and attached to deck panel 487. These panels in addition to serving aesthetic marketing needs also serve to mount the electrical components and gauges necessary for the operator to control the welding process of apparatus 1.

Referring now to FIGS. 2, 3, 11, 12 and 14, the wiring can include a direct current speed controller 490 that is mounted on the inside of panel 480. Speed controller 490 in the illustrated preferred embodiment is a model 125 C direct current speed controller that was manufactured by Dart of Indianapolis, Indiana. Speed controller 490 includes a pair of alternating current input terminals 491 and 492, a pair of direct current output terminals 493 and 494. Speed controller 490 contains means connected to input terminals 491 and 492 and output terminals 493 and 494 for rectifying an alternating current applied across input terminals 491 and 492 and converting the same to direct current across output terminals 493 and 494. Also included are means for varying the voltage of the direct current across the direct current output terminals that include a potentiometer 500 connected at terminals 501, 502 and 503 thereof to terminals 495 and 496 and 497 of speed control 490. Referring now to FIG. 11, potentiometer 500 is mounted to instrument panel 486 in a manner well known in the art. Knob 504 is provided for manipulation of the potentiometer and thus the speed of motor 470 and thus the forward speed of the apparatus 1 herein and the pressure rollers 382 and 402.

A reversal switch 510 can also be provided. Reversal switch 510 is mounted on back panel 488 and is a double pole double through toggle switch. As is well known in the art such a switch has a switch block mounting a set of contacts which in the illustrated preferred embodiment consist of first, second, third and forth contacts 511, 512, 513 and 514. Additionally a pair of movable conductors 515 and 516 are provided. Conductors 515 and 516 are operable to be selectively positioned in unison with conductor 515 against first contact 511 and conductor 516 against second contact 512 or alternately with conductor 515 against third contact 513 and conductor 516 against forth contact 514. The first contact 511 is connected to the forth contact 514 and the second contact 512 is connected to third contact 513. The electric motor 470 is connected to the first and second contacts 511 and 512 (Via terminals 476 and 478 thereof) and the first and second conductors 515 and 516 are connected to output terminals 493 and 494 of speed controller 490. Thus, when the toggle 517 is thrown such that conductors 515 and 516 are against contacts 511 and 502 the electric motor turns in one direction. When the toggle is thrown in the opposite direction, conductors 515 and 516 are against contacts 513 and 514 to reverse the polarity of the current impressed upon electric motor 470 to in turn reverse the direction of output shaft 472 of electric motor 470.

A push button on and off circuit can be provided. This circuit includes a relay switch 520 of the type having an electromagnet 521 mounted in a frame, a pair of fifth and sixth contacts 522 and 523 mounted on the frame, a pair of resilient conductive arms 524 and 525 mounted on the frame and overlying the electromagnet 521 and contacts 522 and 523. Means well known in the art are provided for biasing arms 524 and 525 into a circuit open position, away from fifth and sixth contacts 522 and 523. When an electric current is passed through electromagnet 521, resilient arm 524 is positioned against contact 522 and resilient arm 525 is positioned against contact 523. A push button start switch 530, can also be provided in this circuit, that is normally biased in the circuit open position and a push button stop switch 540 normally biased in the circuit closed position. Both switches 530 and 540 are mounted on instrument panel 486 and relay 520 is mounted on the inside of side panel 480.

As illustrated the on and off circuit can be wired to an alternating current source 550 of 110 volts, 60 cycles having output poles 552 and 554 which can be a standard electrical socket of a house current source. A circuit breaker 560 can be provided having output contacts 562 and 564 and input contacts 566 and 568. The output poles 552 and 554 of current source 550 is attached to input contacts 566 and 568 by a power lead 551 in a manner well known in the art. In the circuit the electromagnet 521 is connected to sixth contact 523 and output contact 564 respectively in series. Start switch 530 is also connected to sixth contact 523 and resilient arm 525 in series by terminals 531 and 532 thereof. Stop switch 540 is connected to resilient arm 525 and to the other output 564 of circuit breaker 560 by terminals 541 and 542 thereof. The resilient arms 524 and 525 are connected to one another. The fifth contact 522 is connected to input terminal 491. When start switch 530 is pushed current flows to electromagnet 521 and arms 524 and 525 contact, fifth and sixth contacts 522 and 523. Since arms 524 and 525 are connected to on another, when the start switch 530 is released, current flows to the electromagnet through sixth contact 523 so that the circuit and hence the electric motor 470 remains on. When stop switch 540 is activated, the circuit is interrupted, the arms 524 and 525 open from contacts 522 and 523 and the electric motor 470 stops.

The aforementioned speed controller 490, the reversal switch 510 and the on and off circuit provide, with circuit breaker 560, the means of the preferred embodiment for connecting the motor 470 to an electrical power source. The speed controller 490 allows the user to adjust the speed of the welding operation in accordance with the thickness of the materials. The reversal switch 510 allows the apparatus 1 to back up to disengage the same from the materials. The push button on and off circuit allows the user to stop the welding operation very rapidly in the event it goes awry. As can be appreciated, any one or all of these components could be eliminated from a possible embodiment of the present invention with the loss of advantageous operation as described hereinabove. For instance, an alternating current motor could be utilized with a simple plug and a length of extension cord to tap a 110 volt 60 cycle alternating current source of electric power.

The two hot air sources 270 and 350 are preferably connected in parallel with one another and then in series with an on and off switch 570 by terminals 571 and 572 thereof and output terminals 562 and 564 of circuit breaker 560 to provide the preferred means of connecting the sources 270 and 350 to the electrical power sours. Switch 570 is mounted on back panel 488.

The heating element cartridges 301, 303, 305, 307 and 309 are preferably connected in parallel to one another and in series with thermo-controller 580 and output terminals 562 and 564. The controller 580 can control a preset temperature of the heating elements. Controller 580 serves as the preferred means of connecting the heating element cartridges to an electrical power source. Controller 580, as would be known to those skilled in the art, is a proportional integral derivative controller (PID) that is self tuning and can either be a $\frac{1}{4}$ or $\frac{1}{8}$ DIN size. Controller 580 was obtained from Chromalox of Tennessee. In order to sense the temperature of prismatic member 290, a thermocouple 582 is provided within bore 290b of member 290. Thermocouple 582 is connected to controller 580 and can be (as well as controller 580) either a J or a K type.

It will be understood by those skilled in the art that the invention has been described with reference to an exemplary preferred embodiment and that variations and modifications can be effected in the described embodiment without departing from the spirit and scope of the invention.

What is claimed is:

1. An apparatus for welding a pair of overlapping thermoplastic materials in sheet form along the overlapping portions thereof, said apparatus comprising:
    a chassis of elongate configurations having a length and a width respectively forming a pair of sides, a front end and a rear end, said chassis being operable to be positioned lengthwise over the overlapping portions with said front and rear ends straddling the overlapping portions of the materials;
    means, connected to said front end of said chassis in an overlying relationship with respect to the overlapping portions, for maintaining a separation between the materials at the overlapping portions thereof, said means including a pair of horizontally overlapping channels, vertically spaced from one another and vertically spaced from the materials with each of said channels being sized and oriented to receive one of the overlapping portions of the materials;
    means, located within the separation and connected to said chassis, for heating the overlapping portions of said materials to plasticity;
    means, connected to said chassis and situated between said rear end of said chassis and said plasticity heating means in an overlapping relationship with respect to the materials, for urging the materials together into the overlapping position and against one another, said urging means including:
        a pair of pressure rollers located in tandem relationship with respect to one another and between said front and said rear ends of said chassis;
        means for pivotally attaching said rollers to said chassis;
        a guide plate for rectangular planar, elongate configuration, sized to extend from said separation maintaining means to at least said rollers, said guide plate being connected to said separation maintaining means beneath said channels and being located between said sides of said chassis, above the thermoplastic materials, said guide plate serving to maintain the overlapping portions of the materials in alignment with each other and to prevent the overlapping portions from contacting any obstacles on the terrain underlying the overlapping portions; and
        means, connected to said pivotal roller attachment means, for biasing said pressure rollers against the materials and said guide plate; and
    means, connected to said chassis, for providing a rolling engagement between said chassis and the thermoplastic materials and for supporting said chassis and said separation maintaining means above said thermoplastic materials, whereby as said chassis is propelled along the overlapping portions, the overlapping portions of the materials are heated to plasticity and welded to one another along the overlap within said urging means.

2. An apparatus as claimed in claim 1 wherein said guide plate includes:
    a pair of rectangular slots, transversely extending across said guide plate with each of said slots underlying a said pressure roller; and
    a pair of guide rollers, each of which is pivotally connected to said guide plate, each of said guide rollers being sized so that a portion thereof is operable to contact a said pressure roller through a said slot, so that each of said pressure rollers bears against said overlapping portions of the sheet materials and a said pressure roller when said apparatus is in use.

3. An apparatus as claimed in claim 2 wherein said guide plate further includes:
    a pair of stiffeners of elongate configuration connected to said guide plate, said stiffeners being spaced apart from one another on either side of said slots and extending lengthwise along the underside of said guide plate.

4. The apparatus of claim 1 wherein said separation maintaining means includes a material guide having:
   (a) an attachment member, connected to said front end of said chassis on the underside thereof in a horizontal orientation, parallel with said front end of said chassis; and
   (b) a separation member of elongate configuration, located between said guide plate and said attachment member, said separation member being oriented parallel to said attachment member and including a pair of opposed ends comprising a pair of first and second spacer elements, each of which has a height at least equal to said thickness of said sheet materials and a length less than that of said separation member, said height of each of said spacer elements being oriented in opposite vertical, directions, said first spacer element connecting said separation member to said attachment member and said second spacer element connecting said guide plate to said separation member, whereby one of said overlapping channels are defined by the inner periphery of said attachment member, said first spacer element and said separation member and the other of said overlapping channels are defined by the inner periphery of said separation member, said second spacer element and said guide plate.

5. The apparatus of claim 1 wherein said pressure roller pivotable attachment means include:
   (a) a first pivoting fork having a first pair of legs, each of which is located on either side of one of said pressure rollers, said first pivoting fork having a pair of opposed ends, a first axle pivotably connected through one of said ends of said first pivoting fork and through the first pair of legs thereof with said one pressure roller fixedly connected to said first axle;
   (b) a second pivoting fork having a second pair of legs each of which is located on one side of said other pressure roller and on the outside of said first pair of legs, said second pivoting fork having a pair of opposed ends, a second axle pivotably connected through one of said ends of said second pivoting fork and through the said second pair of legs thereof with said other pressure roller being fixedly connected to said second axle, said second pivoting fork being pivotably connected, at its other of its said ends to said other of the said ends of said first pivoting fork with said first pair of legs being located between said second pair of legs; and
   (c) means for pivotably connecting said first and second forks to one another at their said other of their said ends thereof and to said chassis.

6. The apparatus of claim 1 further including means for propelling said chassis.

7. The apparatus of claim 6 wherein:
   (a) said chassis further includes means for mounting an electrical motor thereto; and
   (b) said propelling means include:
      (1) an electrical motor mounted on said motor mounting means, said motor having a drive shaft transversely oriented with respect to said chassis;
      (2) means, associated with said drive shaft, said rolling contact and supporting means and said pressure rollers, for transmitting the power of said electric motor from its said drive shaft to said rolling contact and supporting means and said pressure rollers; and
      (3) means for connecting said electric motor to said electrical power source.

8. The apparatus of claim 7 wherein said chassis includes:
   (a) a pair of longitudinal members of elongate configuration, spaced apart from one another to form the said sides of said chassis;
   (b) a pair of transverse members of elongate configuration, spaced apart from one another, said transverse and longitudinal members being connected end to end to form a rectangular configuration wherein one of said transverse members forms the front of said chassis and the other of said transverse members form the rear of said chassis, said one transverse member forming the front of said chassis including,
      (1) a horizontal element having a pair of opposed ends located below said longitudinal members,
      (2) a left element connecting one of said ends of said horizontal element to one of said longitudinal members, and
      (3) a right element connecting the other of said ends of said horizontal element to the other of said longitudinal members, said attachment member being connected to said horizontal element, whereby said guide means and guide plate is located underneath said chassis to minimize the horizontal separation of said materials when passing through said channels;
   (c) a motor mount to form said motor mounting means, said motor mount including,
      (1) a pair of spaced apart first and second lengthwise elements located between said longitudinal members and parallel thereto, and
      (2) a cross element located between said other transverse member, parallel thereto, said first and second lengthwise elements and said cross element being connected end to end and to said other transverse member to form a rectangle with said longitudinal elements forming a pair of opposed sides thereof and said cross element and said other transverse member forming the other of the opposed sides thereof, said motor being connected to said lengthwise elements with said output shaft thereof oriented in a direction parallel to said other transverse member;
   (d) a cross member located between said pressure rollers and said one transverse member, said cross member having a pair of opposed ends, said cross member being connected at its said opposed ends to said longitudinal members at right angles;
   (e) a central lengthwise member being located between said longitudinal members and being sized to extend from said motor mounts to said cross member, said central lengthwise member being cantilevered from said cross element of said motor mounts and extending over said cross member, said first and second hot air guns being vertically connected to said lengthwise member; and wherein, said pressure roller biasing means include,
      (1) a first bearing element of elongate configuration being connected to said first pair of legs between said other end of said first pivoting fork and the outer circumference of said one pressure roller;
      (2) a second bearing element of elongate configuration being connected to said second pair of legs between said other end of said second pivoting fork and the outer circumference of said other pressure roller; and (3) a pair of springs one of which bears against said first bearing member and said central lengthwise member and the other of which bears against said second bearing member and said central lengthwise member.

9. The apparatus of claim 7 wherein said rolling contact and supporting means include:

(a) a first pair of wheels, each of which is located on a side of said chassis, opposite to said other wheel of said first pair and adjacent to said rear end of said chassis;

(b) a second pair of wheels, each of which is located on a side of said chassis, opposite to said other wheel of said second pair and spaced between said first pair and said front end of said chassis;

(c) means for pivotably attaching said first pair of wheels to said chassis; and (d) means for pivotably attaching said second pair of wheels to said chassis.

10. The apparatus of claim 9 wherein:

said second set of wheels pivotable attachment means and said first and second fork pivotable attachment means comprise a third axle having a length greater than the transverse extent of said chassis, said third axle pivotably extending through said longitudinal members, said central lengthwise extending member and said other ends of said first and second forks, said first pair of wheels being connected to third axle;

said first pair of wheels pivotable attachment means comprises a forth axle having a length greater than the transverse extent of said chassis, said forth axle being situated adjacent to said other transverse member and pivotably extending through said longitudinal members, said second pair of wheels being connected to said forth axle; and said transmission means transmits the power of said drive shaft to said third and forth axle.

11. The apparatus of claim 10 wherein: said first axle extends outwardly and transversely from said first pair of legs to define a first extending portion; said second axle extends outwardly and transversely from said second pair of legs, past the first extending portion, to define a second extending portion; and wherein said transmission means include:

(a) a set of first, second, third and forth toothed sprockets, spaced from one another and fixedly connected to said forth axle between said first fork and a said side of said chassis;

(b) a fifth toothed sprocket located opposite to said third toothed sprocket and fixedly connected to said drive shaft of said motor;

(c) a sixth toothed sprocket connected to said first extending portion of said second axle, opposite to said first toothed sprocket;

(d) a seventh toothed sprocket connected to said second extending portion of said second axle, opposite to said second toothed sprocket;

(e) an eighth toothed sprocket being connected to said forth axle opposite to said forth toothed sprocket, said first, second, third, forth, fifth, and eighth toothed sprockets having the same number of teeth and said sixth and seventh toothed sprockets having the same number of teeth, the gear ratio of any one of said first, second, third and forth, fifth and eighth toothed sprockets to the any one of said sixth and seventh toothed sprockets being inversely proportional to the ratio between the diameters of said wheels to said pressure rollers so that the tangential speed of said wheels is equal to the tangential speed of said pressure rollers;

(f) a first roller bearing chain engaged on said third toothed sprocket and said fifth toothed sprocket;

(g) a second roller bearing chain engaged on said second toothed sprocket and said seventh toothed sprocket;

(h) a third roller bearing chain engaged on said first toothed sprocket and said sixth toothed sprocket; and (g) a forth roller bearing chain engaged on said forth toothed sprocket and said eighth toothed sprocket, whereby when said motor is turned on said wheels and pressure rollers are driven in the direction of rotation of said output shaft.

12. The apparatus of claims 7 wherein: said electric motor is a direct current electric motor; said electrical power source is an alternating current power source having a pair of poles; said apparatus further includes a circuit breaker, attached to said chassis, having a pair of circuit breaker input terminals connected to said poles of said alternating current power source and a pair of circuit breaker output terminals; said motor connection to said electrical power source means include:

(a) means, attached to said chassis, for controlling the speed of said drive shaft including, (1) a pair of alternating current input terminals, (2) a pair of direct current output terminals, (3) means, connected to said alternating current input terminals and direct current output terminals for rectifying an alternating current applied across said alternating current input terminals, for converting the same to direct current across said direct current output terminals and for varying the voltage of said direct current across said direct current output terminals including a potentiometer connected thereto that can be manipulated to control the amount of direct current across said direct current output terminals when an alternating current is applied across said alternating current input terminals;

(b) means, attached to said chassis, for connecting said electric motor to said direct current output terminals of said speed control means and for reversing the direction of rotation of said drive shaft of said motor; and (c) means, attached to said chassis, connected to said alternating current input terminals and said circuit breaker output terminals, for starting and stopping said motor;

said first and second heat gun electrical connection means include an on-off switch, attached to said chassis, connected in series with said first and second heat guns, said on-off switch and said first and second heat guns connected in series with said output terminals of said circuit breaker; and said electrical heating element connection means include means, attached to said chassis, connected in series with said heating elements, for controlling the temperature of said heating elements and for visually registering the temperature of said heating elements, said temperature controlling and registering means and said heating elements connected in series to said circuit breaker output terminals.

13. The apparatus of claim 12, wherein:
(a) said drive shaft reversal means include a reversal switch, comprising a double pole, double throw switch of the type that includes a set of first, second, third and forth contacts, and a pair of movable conductors which are operable to be selectively positioned in unison with one conductor against said first contact and the other conductor positioned against said second contact or alternately with said one conductor positioned against said third contact and the said other conductor positioned against said forth contact, said switch being connected with said first contact connected to said forth contact and said second contact being connected to said third contact, said electric motor being connected across said third and forth contacts and with each of said conductors being connected to a said direct current output terminal whereby when said conductors are positioned against said third and forth contacts, said output shaft of said motor rotates in one direction and when said conductors are positioned against said first and second contacts, the polarity across said third and forth contacts reverses to reverse the rotation of said output shaft of said motor; and
(b) said motor starting and stopping means comprises an on and off circuit including,
  (1) a relay switch of the type that includes an electromagnet, a pair fifth and sixth contacts, a pair of resilient conductive arms, overlying said electromagnet and said fifth and sixth contacts, said arms biased into a circuit open position, away from said fifth and sixth contacts, said resilient arms being operable to be positioned against said fifth and sixth contacts with one of said resilient arms against said fifth contact and the other of said resilient arms against said sixth contact when an alternating current is passed through said electromagnet,
  (2) a push button start switch biased in the circuit open position, and
  (3) a push button stop switch biased in the circuit closed position, said on and off circuit wired with said electromagnet connected across said sixth contact and one of said circuit breaker output terminals, said start switch connected across said sixth contact and one of said resilient arms, said stop switch being connected in series with said one resilient arm and said other circuit breaker output terminal, said resilient arms being connected to one another, said fifth contact connected to one of the said alternating current input terminals and said other of said alternating current input terminals being connected to said one circuit breaker output terminals, whereby when said start button is pressed, a current is applied to said electromagnet to bring said resilient arms into contact with said fifth and sixth contacts and to thereby complete the circuit between said alternating current source and said alternating current input terminals and when said stop button is pressed, said current applied to said electromagnet is interrupted to thereby bring said resilient arms away from said fifth and sixth contacts to thereby open the circuit between said alternating current source and said alternating current input terminals.

14. An apparatus for welding a pair of overlapping thermoplastic materials in sheet form along the overlapping portions thereof, said apparatus comprising:
  a chassis of elongate configuration having a length and a width respectively forming a pair of sides, a front end and a rear end, said chassis being operable to be positioned, lengthwise over the overlapping portions of the overlapping materials with said front end and said rear ends straddling the overlapping portions of the materials;
  means, connected to said front end of said chassis in an overlying relationship with respect to the overlapping portions, for maintaining a separation between the materials at the overlapping portions thereof, said means including a pair of horizontally overlapping channels, vertically spaced from one another and vertically spaced from the materials with each of said channels being sized and oriented to receive one of the overlapping portions of the materials;
  means, located within the separation and connected to said chassis, for heating the overlapping portions of the materials to plasticity, said heating means including:
  a prismatic member located within the separation, said prismatic member having a top surface and a bottom surface and being oriented so that said top surface faces one of the overlapping portions and said bottom surface faces the other of the overlapping portions so that the overlapping portions are capable of being heated by said top and bottom surfaces; and
  first hot air means for directing heated air within the separation against the sheet materials and towards said urging means;
  means, connected to said chassis and situated between said rear end of said chassis and said plasticity heating means in an overlying relationship with respect to the materials, for urging the materials together into the overlapping position and against one another; and
  means, connected to said chassis, for providing a rolling engagement between said chassis and the thermoplastic materials and for supporting said chassis and said separation maintaining means above the thermoplastic materials, whereby as said chassis is propelled along the overlapping portions, the overlapping portions of the materials are heated to plasticity and welded to one another along the overlap within said urging means.

15. An apparatus as claimed in claim 14 wherein said heating means further includes second hot air means, located within the separation between said prismatic member and said front end of said chassis, for directing heated air within the separation against the sheet materials.

16. An apparatus as claimed in claim 15 wherein said prismatic member has a front surface connecting said top and said bottom surfaces at one end of said prismatic member and a rear surface connecting said top and said bottom surfaces at the other end of said prismatic member, said bottom surface also being spaced from said top surface a maximum distance that is greater than that of the separation maintained by said separation maintaining means, said prismatic member also having a transverse extent at least equal to the transverse extent of the overlapping portions, said prismatic member being oriented so that said front surface faces said front end of said chassis and said rear surface faces said rear end of said chassis, said prismatic member further including means for connecting said prismatic member to at least one of said sides of said chassis, said prismatic member also including means located within said prismatic member for heating said prismatic member to heat said top and said bottom surfaces.

17. The apparatus of claim 16 wherein said prismatic member includes:
   (a) a uniform cross-section extending in a direction between said front and rear surfaces with said front surface being of arcuate configuration, said upper surface being curved, said lower surface and said rear surface being straight;
   (b) a plurality of bores transversely extending through said prismatic member between said front and rear surfaces;
   (c) a plurality of cartridge-type electrical heating elements located within said bores said heating elements being connected in parallel; and
   (d) means for connecting said electrically powered heating elements to an electrical power source.

18. The apparatus of claim 17 wherein said prismatic member connection means further includes means for pivotably connecting said prismatic member to said one f said sides of said chassis, said prismatic member connection means including:
   (a) a shaft having a pair of opposed ends, one of which is fixedly connected to said front surface with said shaft extending transversely with respect to said prismatic member and the other of which is pivotably connected to a said side of said chassis such that said prismatic member is free to rotate within said separation; and
   (b) a carriage, located adjacent to said top surface of said prismatic member and pivotably connected to said front end of said chassis, said carriage having,
      (1) a pair of arm elements of elongate configuration, spaced apart from one another and parallel thereto, each of said arm elements being pivotably connected to said front end of said chassis and extending from said front end of said chassis in an overlying relationship with respect to said prismatic member,
      (2) a transverse connecting element connecting said arm elements over said prismatic member,
      (3) a pair of contact rollers, located between said transverse connecting element and said front end of said chassis, said rollers being pivotably connected to said arm elements transversely with respect to said prismatic member in an overlying relationship thereto, and
      (4) means for biasing said carriage against said prismatic member so that said rollers contact one of said sheets and bear against said top surface of said prismatic member and rotate said prismatic member about the said shaft so that said lower surface contacts the other of said sheets to insure said sheets of material remain in contact with said prismatic member.

19. The apparatus of claim 18 wherein said prismatic heating member further includes a close fitting sleeve covering said prismatic heating member, said sleeve being fabricated from fiberglass impregnated with teflon to prevent said sheet materials from sticking to said prismatic member.

20. The apparatus of claim 19 wherein: said first hot air means comprises:
   (a) a first tubular manifold of oval cross-section oriented transversely with respect to said chassis with a minor axis of said oval being adjacent to said prismatic member, said manifold being sealed at one end, open at the other end, said manifold having a first plurality of vertical slots situated on the minor axis of said oval facing away from said prismatic member; and
   (b) a first electrically powered heat gun connected to said chassis, said heat gun having a nozzle through which heated air flows; and
   (c) means, connected to said chassis, communicating between said nozzle and said open end of said first manifold, for conducting said heated air to said first manifold and for attaching said first manifold to said chassis;
said second hot air means includes:
   (a) a second tubular manifold of oval cross-section oriented transversely with respect to said chassis with a minor axis of said oval being adjacent to said prismatic member, said manifold being sealed at one end open at the other end, said manifold having a second plurality of vertical slots situated on the minor axis of said oval facing away from said prismatic member;
   (b) a second electrically powered heat gun connected to said chassis, said second heat gun being electrically connected in parallel with said first heat gun, said second heat gun having a nozzle through which heated air flows; and
   (c) means, connected to said chassis, communicating between said nozzle of said second heat gun and said open end of said second manifold for conducting said heated air to said second manifold and for connecting said second manifold to said chassis; and wherein said plasticity heating means further includes means for connecting said first and second heat guns to said electrical power source.

* * * * *